April 15, 1952  J. DAUBER  2,592,543
OPTICAL ANGLE MEASURING APPARATUS
Filed Feb. 6, 1946  2 SHEETS—SHEET 1
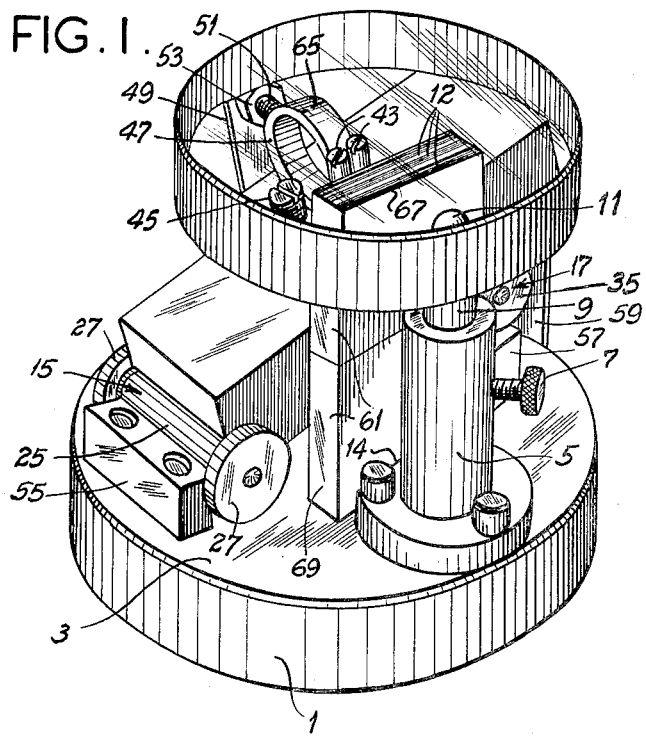
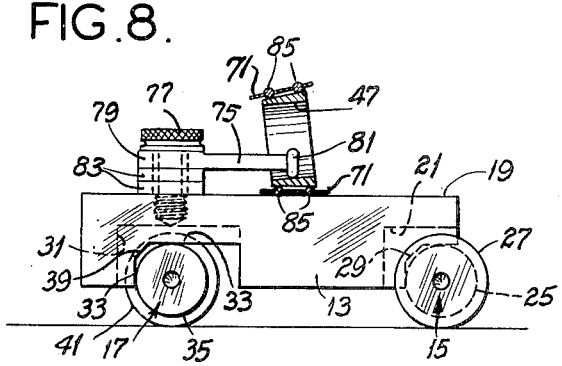
Joseph Dauber,
Inventor.
Haynes and Koenig
Attorneys.

April 15, 1952  J. DAUBER  2,592,543
OPTICAL ANGLE MEASURING APPARATUS
Filed Feb. 6, 1946  2 SHEETS—SHEET 2
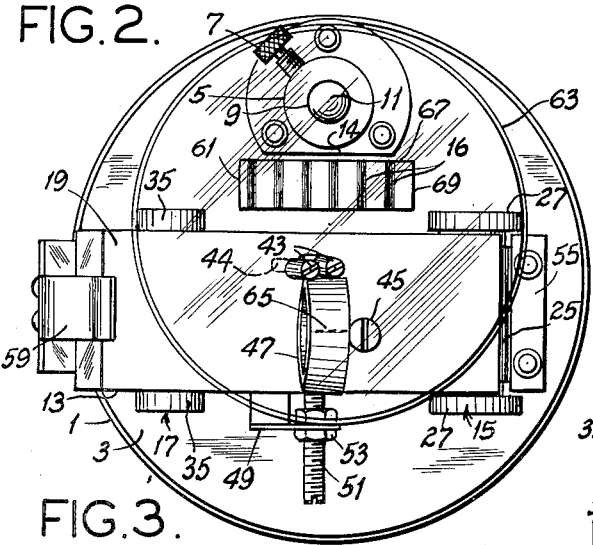
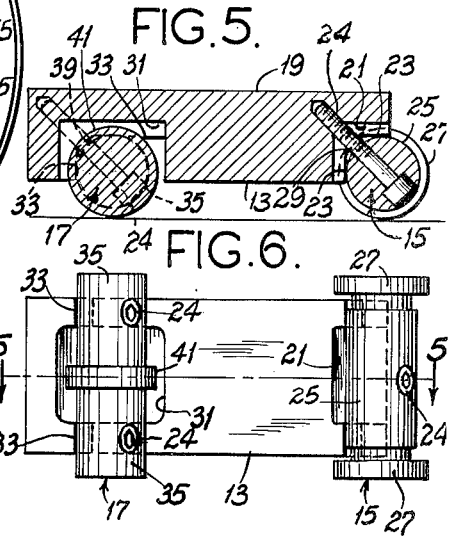
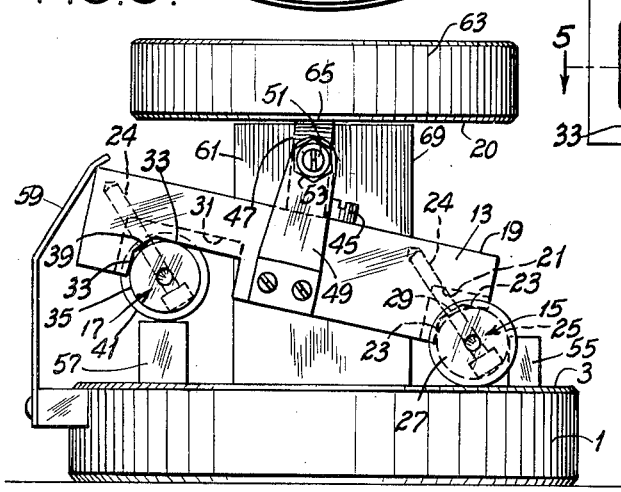
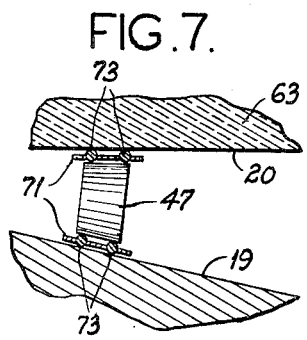
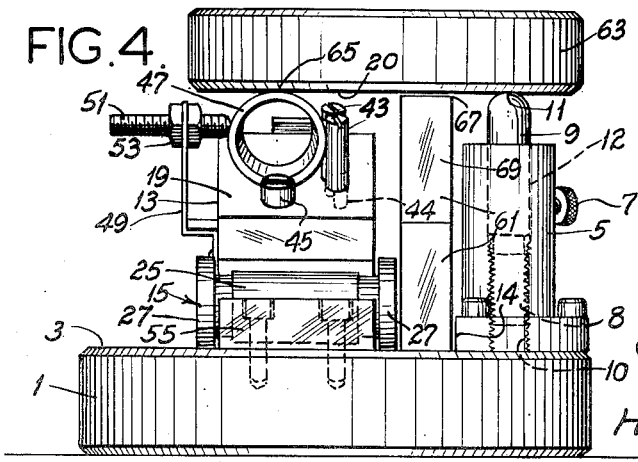
Joseph Dauber,
Inventor.
Haynes and Koenig
Attorneys.

Patented Apr. 15, 1952

2,592,543

UNITED STATES PATENT OFFICE 2,592,543

OPTICAL ANGLE MEASURING APPARATUS

Joseph Dauber, Chicago, Ill., assignor to Acme Scientific Company, Chicago, Ill., a corporation of Illinois Application February 6, 1946, Serial No. 645,926

5 Claims. (Cl. 33—174)

This invention relates to optical measuring apparatus, and with regard to certain more specific features, to an optical sine bar for measuring angle tapers.

Among the several objects of the invention may be noted the provision of simple apparatus for measuring tapers or angles of bodies capable of manifesting either intended or unintended tapered or angled wedge shapes, such as cones, pyramids, prisms, cylinders and the like; the provision of means for measuring deviation from a specific taper; and the provision of apparatus of this class which has means for determining initial error within the apparatus itself. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a perspective view of the invention;

Fig. 2 is a top plan view;

Fig. 3 is a front elevation of Fig. 2;

Fig. 4 is a right-side elevation of Fig. 3;

Fig. 5 is a longitudinal section taken on line 5—5 of Fig. 6, and shows a roll-supported angle block or sine bar;

Fig. 6 is a bottom plan view of Fig. 5;

Fig. 7 is a detail section showing means for handling bulged cones; and,

Fig. 8 is a detail view of the angle block of Fig. 5 but showing an alternative form of work holder.

Similar reference characters indicate corresponding parts throughout the several views of the drawings.

Referring now more particularly to the drawings, numeral 1 shows an accurately flat metal base, such as a tool maker's flat. This is preferably chromium plated, at least on its upper surface 3, and provides one of the optically flat surfaces desired. On the flat upper side of this base is located cylindric support 5, having a vertically thread shank 9 operable up and down by turning it. The shank 9 has a rounded supporting nose 11 providing a single-point support. For accurate adjustment the shank 9 is provided with a fine male thread 8 at its lower end which is an accurate fit in a corresponding female thread 10 in the lower portion of the support 5.

To assure that the threads fit without backlash, the threads on 9 are in the form of a tap. Upon insertion of the tap into the previously roughed-out female threads in member 5, this tap performs a finishing tapping operation, thereby generating a female thread which fits it exactly. The remainder 12 of the shank 9 is accurately lap fitted to the unthreaded upper portion of the bore in 5, which makes the shank 9 substantially free from shake during adjustment. A thumbscrew 7 is provided to clamp the shank 9 against inadvertent further rotation, once a desired height has been attained.

At numeral 13 is shown an angled block supported upon accurately made rolls 15 and 17. This assembly 13, 15, 17 may also be called a sine bar. The block 13 has an optically flat upper surface 19. It is recessed at what becomes its lower end, as shown at 21. This provides right-angular supporting portions 23 for accurate tangent contact with a central cylindric part 25 of the roll 15. The ends 27 of the roll 15 are of equal size and larger than the central cylindric part 25. It should be noted that the beveled portion 29 between the right-angular portion 23 does not touch the part 25.

Toward the other end the angle block 13 is recessed as shown at 31. The sides of this recess provide right-angular portions 33 for contacting gudgeons 35 on the second roll 17. Beveled portions 39 between the pairs of right-angular portions 33 do not touch the gudgeons 35. The roll 17 is provided with a central integral disc extension 41 which is located within the recess 31 and clears it. Parts 27 and 41 are accurately the same size, as are also the parts 25 and 35.

The angle block 13 is attached to the parts 35 and 25 by means of angle screws 24 (Fig. 3). The end portions 27 (of roll 15) and portion 41 (of roll 17) will act as a three-point support. The collar portions 27 and 41 should be accurately finished circles such that a plane passing tangentially to the three of them is accurately parallel with the optically flat upper surface 19 of block 13.

On the top surface 19 of the block 13 are a pair of lateral stop pins 43 and also an end stop pin 45, for aligning a conical work piece such as 47. The stop pins 43 are adjustable by means of eccentric extensions 44 below the surface 19, which enables the pins 43 to be adjusted so that the center line of the work may be made to lie, as accurately as desired, in the normal plane of the dihedral angle determined by the inclined member 13. A bracket 49 carries an adjustable set screw 51 which may be locked in position by lock nut 53. By means of the pins 43 and 45 and the screw 51, the conical part 47 may be held on the optical flat 19 with one of its conical elements lying thereon. The axis of the work 47 should be in a plane substantially perpendicular to the axes of the rolls 15 and 17.

A block 55 attached to the optical flat 3 forms an abutment for the cylindric portion 25 of the roll 15 (see Figs. 1, 2 and 3).

At numeral 57 is shown a gage block which is wrung to the flat 3. The height of this gage block 57 is such that when the collar 41 rests thereon, while the collars 27 rest on the flat 3, the angle of the upper surface 19 of the block will be such that the upper conical element of the work 47 will be horizontal when its lower conical element rests upon said surface 19, provided the work is accurate. A spring 59 simultaneously presses collar 41 against the gage block 57 and the cylinder 25 into the angle between stop block 55 and the surface 3.

At numerals 61 are gage blocks in a stack, the bottom one of which is wrung to the base flat 3, the blocks also being otherwise wrung together. The total height of the stack of flats 61 is to be .001 to .002 inch or so lower in height than the upper conical element of the work 47. The long dimensions of the flats are substantially parallel to the long dimension of the block 13. This is accomplished by aligning them with a flat portion 14 on the otherwise cylindric support 5 which is parallel to said long dimension.

At numeral 63 is shown a glass optical flat. This is at least optically flat on its bottom and it rests upon the upper significant conical element of the work as shown at 65. Since the stack of gage blocks 61 is slightly lower than the bottom of the optical flat 63, the latter will, in addition to resting upon the work, rest upon one edge 67 of the gage block stack, provided that the nose 11 is initially sufficiently below the level of the top of the gage blocks, as it should be at this time. This condition is not shown in Figs. 2–4 of the drawings but can be readily visualized by considering the nose 11 to be lowered in Fig. 4. Consequently, if the assembly be viewed in a monochromatic light, such as for example, from a helium lamp, a series of interference bands will appear parallel to the long edge 67 of the gage block. These are shown at 12 in Fig. 1. Viewed from above, these bands appear through the optical flat 63.

The height of the point 11 is then adjusted until point 11 makes contact with the bottom working surface of the optical flat 63 and lifts said flat. The flat, it will be recalled, rests upon the upper element 65 of the work 47. The bands 12 immediately become disturbed and as elevation proceeds, these bands 12 gradually shift angularly. Elevation is stopped when they are at right angles to their former positions, as shown at 16 in Fig. 2. In this position the bands are parallel to the short sides 69 of the stack of blocks 61. The existence of these bands 16 indicates a lack of parallelism between the bottom plane 20 of the optical flat 63 and the top of the uppermost gage block 61 in the direction parallel to the length of the blocks 61 and block 13. It therefore also indicates a lack of parallelism between the element 65 of the work 47 and the plane of surface 3. Since the angle of the block 13 has been chosen such that if the work were of correct angle the element 65 would be parallel to the plane of surface 3, it may be assumed that under the stated conditions wherein the bands 15 show, the angle of the work is incorrect. In other words, adjustment of the point 11 until the parallel lines 16 appear, establishes the angle of the bottom plane 20 of the optical flat 63, and hence the angle of the element 65, relatively to the surface 3.

The number of bands is a measure of the inclination of the bottom of the optical flat 63 with respect to the horizontal plane of the top of gage blocks 61, and consequently, it is also a measure of the inclination of the upper element 65 of the work from the nominal value.

As an example, let the specified tolerance of the taper on the work 47 be ±.005 inch in 6 inches. If the upper gage block 61 is 1⅜ inches long (see edge 67) the stated taper amounts to .000115 inch in this length of the block. Since each interference band under the monochromatic helium light represents a deviation of .0000116 inch, it will be seen that the work will be about or within tolerance if ten or fewer bands appear on the gage block surface.

If the work is exactly correct in angle, no bands will appear across the gage block. This is also true when the work is very far out of limits, but the existence of a correct condition for measurement is revealed by the fact that bands appear if the optical flat is lightly touched so as to bring the surfaces of the optical flat 63 and of the stack 61 slightly out of parallel. Since bands can be readily seen when the inaccuracy of the angle is ten times as great as permitted, this factor presents no real difficulty.

It often occurs that the conical surface of a piece such as 47 is not only off-angle between its ends, or two chosen points on it, but that it is bowed between the ends. For example, it may be curved either with a bulge or a constriction. If the curvature is in the form of a bulge this means that the work 47 may rock on the surface 19, and also that the optical flat 63 may rock on the element 65 of work. This makes measurement difficult because of sensitivity. However, this sensitivity reveals hitherto often unsuspected defects in the pieces. Whether the defect is a bulge or concave cavity may readily be detected if the work piece has a fairly high finish, or can be provided with such a finish without changing its shape. The latter method consists in illuminating with sufficiently monochromatic light the point of contact of the work piece with the overlying optical flat, and examining it with a microscope of appropriate magnification. The interference bands thus seen are, as usual, the measure of the departure of the surface from a true cone. In addition it may still be desirable to obtain a measure of the overall taper included between two definite points, even in the presence of bulging curvature. For this purpose fixtures may be employed having provision for placement of accurate wires 73, of equal sizes disposed as shown in Fig. 7. These wires may for example be accurate to within .00001 inch. The lower pair rest upon the surface 19 and the upper ones support the optical flat 63. The work piece 47 is located between the pairs of wires. The measurement then made as above described will indicate taper deviation between the points on the work at which the members of the upper and lower sets of wires contact.

In Fig. 8 is shown another method for holding the work on the block 13. In this case an arm 75 is held in place on the block 13 by means of a thumbscrew 77 passing through an eye 79 and threaded into the block 13. The end of the arm 75 has an overhanging head 81. Shims 83 beneath the eye 79 control the spacing of head 81 from surface 19. Then by pushing the work under the head 81 with or without the wires 85 (wires shown in Fig. 8), the head will slightly spring the arm 75 so that the work will be properly held. The head 81 presses against the inner wall of the work piece 47 downwardly and diagonally toward the pins 43 in order that the work may be simultaneously pressed against both the pins 43 and the lower wires 85.

Any slight deviation of the axis of the work out of the plane of the vertical angle formed by the inclined bar does not affect the accuracy substantially. Thus misalignment of the order of ½° results in a maximum permissible angle error of measurement (due to the misalignment), which error for most work is negligible. And, errors of alignment of a half degree or so are readily detectable by the eye and are therefore easily avoided.

In use, the equipment requires about five minutes (time) for very accurate measurement of a piece, including the time for several rechecks. The device is versatile in its wide range of applications.

The initial angular error of the sine or angle bar 13 may be checked. This is effected by making its upper polished surface optically flat within some specified limits. It is then placed with its rolls on a glass or quartz optical flat of adequate diameter. A second optical flat is supported about .002 inch above the sine bar by three equal stacks of gage blocks resting upon the said quartz optical flat. The upper flat should then be parallel to the lower flat. If the upper surface of the sine bar is then parallel to the plane upon which the rolls rest, it will also be parallel to the upper optical flat, and when viewed in a monochromatic light no interference bands will appear. If, however, the upper surface of the sine bar is not parallel to the plane upon which the rolls rest, the amount of non-parallelism will be indicated by the number of interference bands which will appear, or by the spacing between them. The apparatus for checking as described is not shown in the drawings because it is the same type that would be used for checking for parallel surfaces on other optical flats or gage blocks. The point is mentioned, however, since it indicates the importance of the optically flat characteristics of the upper surface 19 of the bar 13. It also calls attention to the importance of the requirement for parallelism between the surface 19 and a plane tangent to the bottoms of the circles of 27 and 41.

It is to be understood that although the application uses as an illustration the measurement of a deviation from prescribed value of the external taper of a hollow piece in the shape of a truncated cone, other types of tapering work may be accommodated with suitable adaptations of the holding fixtures.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Optical angle measuring apparatus comprising a block which is optically flat on its top, a plurality of supports for said block, a base member having an optically flat upper surface supporting at least one of said supports, a first gage block means resting upon said last-named surface and supporting at least another one of the supports for holding at an angle the flat top of said block, means on said block for supporting a piece of conical work, an adjustable support on said base member, at least one additional gage block means resting on said surface of the base member and located between the work and said adjustable support, a transparent member having an optically flat bottom surface resting upon said work and upon said adjustable support, the spacing between said additional gage block means and the optically flat bottom of said transparent member being small enough to produce interference bands visible through the transparent member.

2. Optical angle measuring apparatus comprising a block which is optically flat on its top, a plurality of circular supports for said block, the block having means on its underside for engaging said supports, the effective diameters of said supports being such that a tangent plane touching all of them beneath the block will be parallel to said optical flat top, a base member having an optically flat upper surface supporting at least one of said circular supports, a gage block resting upon said surface of the base member and supporting the remainder of said circular supports, means on said block for supporting a piece of conical work on its flat top, an adjustable support on said base member, at least one additional gage block means resting on the base member and located between the work and said adjustable support, a transparent member having an optically flat bottom resting upon said work and upon said adjustable support, the spacing between said additional gage block means and said optically flat bottom being adapted to produce interference bands if the upper surface of the work and of said last-named gage block are not parallel.

3. Optical angle measuring apparatus comprising a base having an accurate flat top, a gage block resting upon said top, a sine bar having an optically flat top and supported upon the flat top of said base and the gage block to predetermine an angle of said optically flat top of the bar, means supporting angled work on the angled flat top of the bar, a transparent optical flat, an adjustable single-point support on said base for one portion of said optical flat, another portion of said flat resting upon the angled work, and at least one other gage block resting upon the top of said base and extending to a region close to the bottom of said optical flat and located between said single-point support and the region of support of the flat on the work.

4. Optical angle measuring apparatus comprising a base having an accurate flat top, a gage block resting upon said top, a sine bar having an optically flat top and having roller supports upon the flat top of said base and upon the gage block to predetermine an angle of said optically flat top of the bar, means supporting conical work on the flat top of the bar with the axis of the work lying in a plane which is perpendicular to said flat top and also perpendicular to the axes of the roller supports, a transparent flat having an optically flat bottom, an adjustable single-point support on said base for the flat bottom of said transparent flat, another portion of said flat bottom resting upon a line element of the conical work, and at least one other gage block resting upon the top of said base and extending to a point close to the bottom of said transparent flat.

5. Optical angle measuring apparatus comprising a base having an accurate horizontal flat top, an angle block having an accurate flat top, three supporting means for the angle block at least a portion of which rest upon the upper surface of the base, a gage block resting upon said upper surface of the base and supporting the angle block by the remaining supporting means and thereby controlling the angle of the upper surface of said angle block, means for holding conical work on the angle block with its axis in a plane normal to said flat top and normal to the upper surface of said angle block, the angle of the upper surface of the angle block being such that if the conical work were perfect an upper significant line element thereof would be parallel to the top of the base, additional gage block means resting upon the upper surface of the base adjacent the work and having an upper horizontal surface slightly lower than said line element of the work an adjustable supporting means on said base, and a transparent flat having an optically flat bottom resting upon said line element and upon said adjustable support and extending over and adjacent to the upper horizontal surface of said additional gage block means.

JOSEPH DAUBER.

REFERENCES CITED

The following references are of record in the file of this patent:

UNITED STATES PATENTS

| Number | Name | Date |
|---|---|---|
| 1,395,664 | Benson | Nov. 1, 1921 |
| 1,554,392 | Weaver | Sept. 22, 1925 |
| 1,901,632 | Chamberlain | Mar. 14, 1933 |
| 1,931,730 | Klay | Oct. 24, 1933 |
| 2,306,227 | Seidel | Dec. 22, 1942 |
| 2,325,904 | Brabeck | Aug. 3, 1943 |
| 2,351,773 | Lovenston | June 20, 1944 |
| 2,359,018 | Balk | Sept. 26, 1944 |
| 2,365,436 | Saucier | Dec. 19, 1944 |
| 2,376,959 | Christel | May 29, 1945 |
| 2,417,150 | Berry | Mar. 11, 1947 |
| 2,446,562 | Trbojevich | Aug. 10, 1948 |

FOREIGN PATENTS

| Number | Country | Date |
|---|---|---|
| 710,881 | Germany | Sept. 23, 1941 |